(12) United States Patent
Giri

(10) Patent No.: US 7,206,927 B2
(45) Date of Patent: Apr. 17, 2007

(54) PIPELINED PROCESSOR METHOD AND CIRCUIT WITH INTERLEAVING OF ITERATIVE OPERATIONS

(75) Inventor: Abhijit Giri, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 521 days.

(21) Appl. No.: 10/299,412

(22) Filed: Nov. 19, 2002

(65) Prior Publication Data

US 2004/0098570 A1   May 20, 2004

(51) Int. Cl.
*G06F 7/38*   (2006.01)

(52) U.S. Cl. ............... 712/241; 712/219; 712/221; 708/523

(58) Field of Classification Search ........... 712/215, 712/241

See application file for complete search history.

(56) References Cited

U.S. PATENT DOCUMENTS 4,853,890 A * 8/1989 Abe et al. .................. 712/4

(Continued)

FOREIGN PATENT DOCUMENTS

EP   0 718 757 A2   6/1996

(Continued)

OTHER PUBLICATIONS

Hennessy and Patterson, Computer Organization and Design, Morgan Kaufman Publishers, Inc., 1998, pp. 378, B-9 and Last Page (un-numbered).*

(Continued)

*Primary Examiner*—Eddie Chan
*Assistant Examiner*—Ryan Fiegle
(74) *Attorney, Agent, or Firm*—Wolf, Greenfield & Sacks, P.C.

(57) ABSTRACT

A method of executing an instruction stream in a pipelined execution unit of depth, p, comprises loading the instruction stream; detecting an iteration of an instruction in the loaded instruction stream; interleaving p steams of instances of the instruction in the pipeline; detecting an end of the iteration; and combining results obtained from the p streams after all programmed iterations have completed. A computational circuit comprises a register which can hold a value representing both an operand and result of an iterative operation; a multiplexer having a first input connected to receive the operand from the register, a second input connected to a source of an identify value for the iterative operation, and an output; and an operator circuit having an input connected to receive a value from the multiplexer output, and an output connected to return thee result to the register. A method of executing an instruction stream in a pipelined execution unit comprises providing to the execution unit the instruction stream as a sequence of instruction in natural order absent software scheduling; detecting an iteration of an instruction in the sequence of instruction; and introducing into a pipeline of the pipelined execution unit plural instances of the iterated instruction, each with different data. A method of executing an instruction stream in a pipelined execution unit comprises detecting an iteration of an instruction in the instruction stream; independently executing plural streams of the iterated instruction; and recombining the independently executed plural streams to provide a single result; wherein independently executing and recombining use not more than one destination register and not more than one temporary register. In a programmable data processor including instruction interlocks and including a pipelined computation unit having a pipeline of depth p, a circuit comprises a controller constructed and arranged to detect an iterative computation in an incoming instruction stream.

16 Claims, 7 Drawing Sheets

U.S. PATENT DOCUMENTS

| | | | |
|---|---|---|---|
| 5,123,108 A * | 6/1992 | Olson et al. | 712/218 |
| 2002/0194466 A1 * | 12/2002 | Catherwood et al. | 712/241 |
| 2003/0154227 A1 * | 8/2003 | Howard et al. | 708/495 |

FOREIGN PATENT DOCUMENTS

| | | |
|---|---|---|
| WO | WO 02/077794 A2 | 10/2002 |

OTHER PUBLICATIONS

The Authoritative Dictionary of IEEE Standards Terms, 7th Ed., IEEE Press, 2000, p. 716.*

* cited by examiner

PIPELINED PROCESSOR METHOD AND CIRCUIT WITH INTERLEAVING OF ITERATIVE OPERATIONS

BACKGROUND

This application relates to pipelined data processors, including digital signal processors (DSPs) and general purpose processors. This application relates more particularly to processors in which the execution unit is pipelined.

Pipelining is a processor architecture technique that increases overall throughput by enabling the processor to perform multiple actions in parallel. Pipelining divides the execution of each instruction of a stream into a series of steps or stages. The output of each stage is the input to the next. Frequency of operation and thus throughput is increased because different stages of adjacent instructions in the stream are processed in parallel.

While all the functional units in a processor can be pipelined to various depths in order to achieve an optimal increase in the throughput, further references to "pipeline" in this document refers to the pipeline present in the execution units for computations only.

Pipelining deeply, that is dividing each instruction into a large number of stages, hence beginning execution of large numbers of instructions in sequence, increases parallelism and hence the throughput improvement. However, pipelining deeply has costs. One cost of pipelining deeply is illustrated when an instruction sequence requires a change of control. A change of control requires that all instructions then entered into the pipeline which may have been partly executed be flushed from the pipeline, causing the efficiency gained by using the pipeline to then be lost. For example, using a ten stage deep pipeline, ten instructions reside in the pipeline at any point in time. Therefore, when a change in control occurs, the work done on each of those ten instructions up to the point of the requested change in control is lost.

If a second instruction depends for an operand upon a first instruction, then a dependency exists that stalls the execution pipeline, as follows. The first instruction must complete execution before the second instruction can be issued into the pipeline. When the first instruction completes, the second instruction then has access to the required operand and can be issued into the pipeline. The impact of the stall depends on the depth of the pipeline.

A particular, and in digital signal processing common, example of the foregoing cost of deep pipelining arises when iterative operations are performed. Iterative operations are those which require the location of an operand of an instruction also be the destination of the result of the instruction. Iteration is the act of performing an iterative operation. Digital signal processing frequently includes iterative operations, such as the accumulation of a sum. The repeated execution of the instruction specifying an iterative operation forms a pattern similar to the pattern of first and second instructions discussed above. In this pattern, the first instance of the instruction to be repeated takes the role of the first instruction, above, and the second instance of the instruction to be repeated takes on the role of the second instruction, above. Thus, an iterative operation results in numerous, possibly lengthy, stalls of the pipeline.

This problem has been known to skilled artisans for a long time. Numerous attempts at solving it have been made, but each with disadvantages.

One proposed solution is software scheduling, which can be described as follows. Using software scheduling, the software is designed to independently launch a first instance of an iterative operation, followed by a second instance of the same iterative operation, but with independent data. Then, the two instances proceed independently, each using as operands data not already in the pipeline. The last instance of the iterative operation then bears the cost of recombining the independent computational streams. In order to make optimum use of a particular pipeline having a particular depth, the number of instances independently launched should equal to the particular depth.

Software scheduling is disadvantageous because the operands required for all of the independent instances need to be held in a register file, or otherwise made available at the times needed, thus using more system resources than would be required for iteration without software scheduling. Without software scheduling, only two registers are required, the accumulator register and the register containing the new operand. With software scheduling, an accumulator register is required for each instance of the iterative operation.

Another problem with software scheduling is that software designed in this manner for a particular original processor is then incompatible with a future faster variant of the processor using the same, or a compatible superset of the instruction set used by the original processor, and otherwise compatible with the original software, but whose pipeline is of a different depth. It is common for processor vendors to develop and manufacture faster versions of the existing processor by increasing the depth of the pipeline.

Operation of the issue stage of a conventional execution unit is now described in connection with the flowchart of FIG. 5. The issue stage is the stage that controls issuance of instructions into the pipeline.

The issue stage in an interlocked pipelined processor performs a series of steps beginning with making a determination as to whether or not the pipeline has been stalled 501, due to a dependent instruction, as explained below. If the execution unit has not been stalled, then the next instruction is fetched 502. Otherwise, if the execution unit has been stalled 501, then the current instruction is kept 503. In either case, the dependencies of the instruction to be issued are then evaluated 504. If one or more operands in an instruction depend on the result of a previous instruction, then a data dependency is said to exist. If the current instruction is found not to be dependent 505, then the current instruction is issued 506. The issue stage cycle is then completed. If, however, the instruction is found to be dependent 505, then the execution unit is stalled 507 and the issue stage cycle is completed. The state of the execution unit as having been stalled or not can be stored by any suitable means, for example by setting a flag bit in a flag register.

In case of a processor incorporating non-interlocked pipeline, the issue stage does not perform any of the dependency checks detailed above. It simply issues each instruction in turn, into the pipeline of the execution unit. The software for such a processor is usually written in a way that, any pair of inter-dependent instructions are separated by adequate number of unrelated instructions, such as NOP (no-operation) instructions, such that operands for any given instruction are guaranteed to be ready at the time the instruction needs these. Normally, a compiler program generates instructions for such processors.

A conventional execution unit, as shown in FIG. 6, fed by one stage of an execution pipeline having plural stages comprises simply an operator unit, such as adder 601, a register file 602 and a controller 603. Controller 603 directs operation of the execution unit according to principles discussed above in connection with the flowchart of FIG. 5.

SUMMARY OF INVENTION

According to aspects of an embodiment of the invention, a method of executing an instruction stream in a pipelined execution unit of depth, p, comprises: loading the instruction stream; detecting an iteration of an instruction in the loaded instruction stream; interleaving p streams of instances of the instruction in the pipeline such that the pipeline provides intermediate storage for the p streams of instances; detecting an end of the iteration; and combining results obtained from the p streams after all programmed iterations have completed. The depth of the pipelined execution unit may have any depth. The method may further comprise disabling interlocking for the detected iteration of the instruction. In a variation of the method, detecting may further comprise recognizing the iteration of the instruction on the basis of the iterated instruction having an operand and a destination that are the same. The iteration of the instruction may perform an arithmetic accumulation, or may perform an arithmetic product, for example.

According to another aspect of an embodiment of the invention, a computational circuit comprises: a register which can hold a value representing both an operand and result of an iterative operation; a multiplexer having a first input connected to receive the operand from the register, a second input connected to a source of an identity value for the iterative operation, and an output; and an operator circuit having an input connected to receive a value from the multiplexer output, and an output connected to return the result to the register. The circuit may further comprise a control circuit constructed and arranged to detect the iterative operation. The operator circuit may comprise an adder or a multiplier, for example. The control circuit may further comprise: a sequencer constructed and arranged to interleave p streams of instances of the instruction in the pipeline and to combine results obtained from the p streams after all programmed iterations have completed. The circuit may be constructed so that detecting further comprises: recognizing the iteration of the instruction on the basis of the iterated instruction having an operand and a destination that are the same. The circuit may further be constructed so the iteration of the instruction performs an arithmetic accumulation or performs an arithmetic product, for example.

According to yet another aspect of an embodiment of the invention, a method of executing an instruction stream in a pipelined execution unit, comprises: providing to the execution unit the instruction stream as a sequence of instructions in natural order absent software scheduling; detecting an iteration of an instruction in the sequence of instruction; introducing into a pipeline of the pipelined execution unit plural instances of the iterated instruction, each with different data; and storing results for each of the plural instances in the pipeline. Detecting may further comprise: recognizing the iteration of the instruction on the basis of the iterated instruction having an operand and a destination that are the same. The method may further comprise disabling interlocking for the detected iteration of the instruction. Iteration of the instruction may perform an arithmetic accumulation or may perform an arithmetic product, for example.

According to yet another embodiment of the invention, a method of executing an instruction stream in a pipelined execution unit comprises: detecting an iteration of an instruction in the instruction stream; independently executing plural streams of the iterated instruction without storing intermediate results outside of the pipelined execution unit; and recombining the independently executed plural streams to provide a single result; wherein independently executing and recombining use only one destination register and only one temporary register. The method may further comprise introducing operands whose value is the identity value for the instruction during an initiation phase.

In a programmable data processor including instruction interlocks and including a pipelined computation unit having a pipeline of depth p, aspects of the invention may be embodied in a circuit comprising a controller constructed and arranged to detect an iterative computation in an incoming instruction stream. The controller may further comprise a circuit constructed and arranged to detect an instruction having a single register designated as both a source of an operand and a destination for storing a result. The controller may further comprise a circuit constructed and arranged to detect a break in an iteration when one of an instruction lacking a single register designated as both a source of an operand and a destination for storing a result, or an instruction having a different destination register occurs. The controller may yet further comprise a circuit that disables read-after-write and write-after-read interlocks. According to some variations, the controller is constructed and arranged to interleave up to p streams of iterations which are overlapped in the pipeline. The controller may further comprise a circuit constructed and arranged to combine p intermediate results from the p streams into a final result. The circuit may further comprise a register T not used for other computation; the controller being further constructed and arranged to redirect results to the register T, after detection of the break. Finally, the controller may further comprise a circuit constructed and arranged to redeploy the interlocks after the iteration is completed.

According to yet another embodiment of the invention, a method of preparing a sequence of software instructions for execution in a pipelined execution unit comprises: detecting an iterated instruction in the sequence; and arranging instances of the iterated instruction to form plural independent streams, not dependent on each other, wherein results from each of the plural independent streams are not stored to a register outside the pipeline until all iterations of the iterated instruction are complete.

In case of processors incorporating non-interlocked pipeline, the execution unit is not modified. However the instruction stream for the accumulation operation is modified in a suitable manner so as to produce the same result in significantly lesser number of cycles.

BRIEF DESCRIPTION OF DRAWINGS

In the drawings, in which like reference designations indicate like elements.

DETAILED DESCRIPTION

Figure 1:
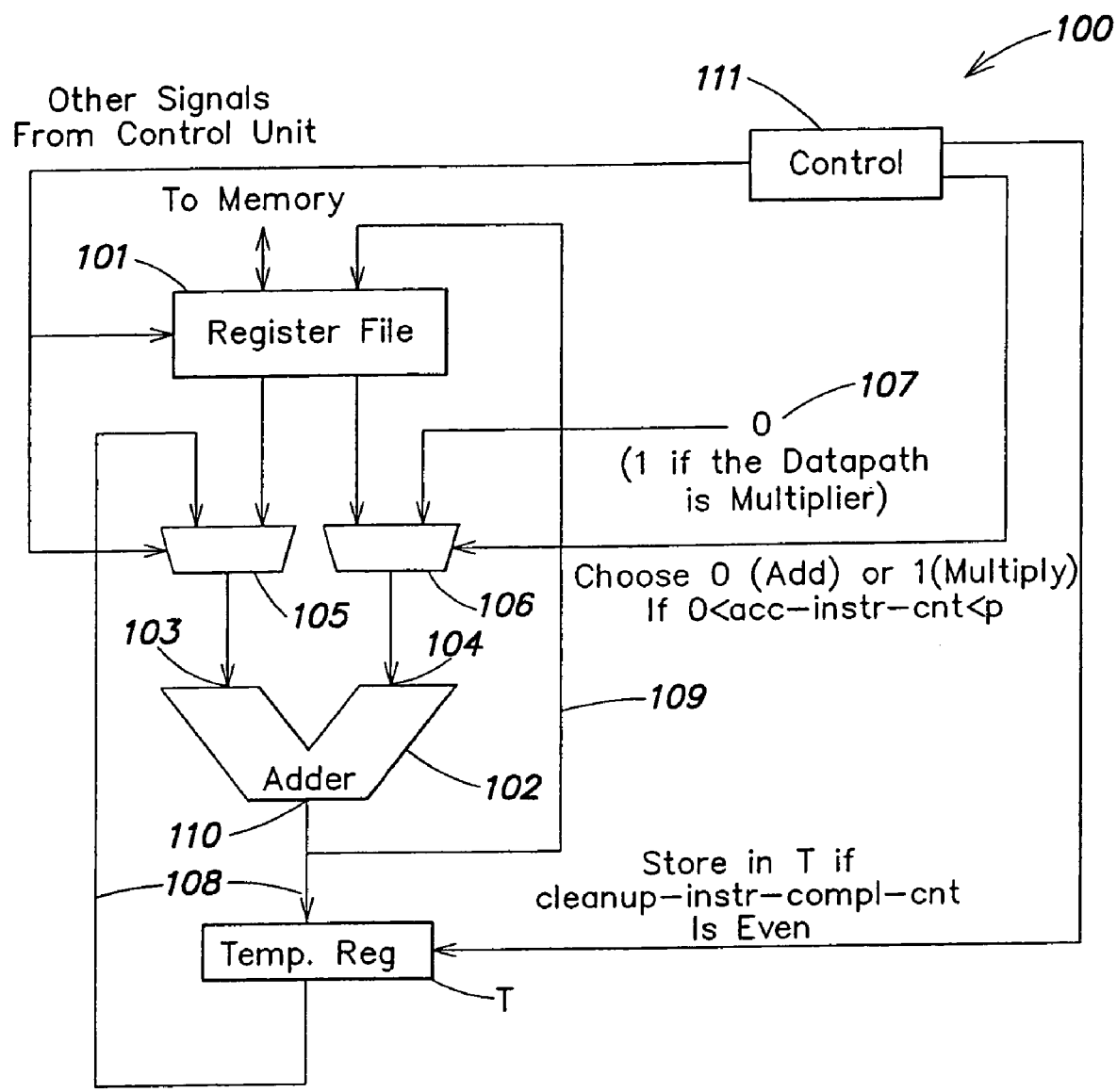
FIG. 1 is a block diagram of an execution unit embodying aspects of the invention, the unit is assumed to be pipelined.

The present invention will be better understood by reading the following description of embodiments of various aspects thereof, together with the drawings.

Aspects of the present invention may be embodied in methods or apparatus. Aspects of the invention may be embodied in processors having a pipelined execution unit. Processors having a pipelined execution unit and embodying aspects of the invention may or may not be interlocked. Embodying aspects of the invention in a pipelined processor may speed up the execution, in the sense of total number of cycles taken, of an iterative operation, referred to herein as an accumulation. An accumulation is comprised of an accumulation instruction repeated one or more times. An accumulation instruction is an instruction for which at least one operand register is the same as the destination register of the instruction, represented by the form: $Rx \leftarrow Rx(\ )Ry$; where "$(\ )$" denotes an operation and "$\leftarrow$" denotes assignment of a resultant value to a destination. Typically, although not exclusively, accumulation instructions include add and multiply instructions. However, other instructions can also be accumulation instructions; for example, the logical "OR" instruction can be an accumulation instruction when computing hash values.

Methods embodying aspects of the invention detect accumulation instructions, and inject them into the execution unit pipeline in an unconventional way. In particular, as explained in detail below, for a pipeline having a depth p, a method embodying aspects of the invention interleaves in the pipeline, p streams of instances of an accumulation instruction, without assigning a separate accumulator for each. Then, when the end of an accumulation is detected, the p streams are combined to yield the desired result, which is assigned to the designated destination register.

As further explained below, accumulation instructions are detected either by a modified interlock circuit, or by a circuit that mimics at least some of the operational characteristics of such a circuit, or by suitable software logic in a software compiler, for example. In a processor that employs interlocking to prevent an instruction from starting while data required by that instruction is not yet available from a previous instruction, interlocking is turned off relative to the interleaved streams of instructions mentioned above. Interlocking may, however, remain operative relative to the starting of an instruction that follows the last instance of an accumulation instruction, called a break in accumulation, herein.

Apparatus embodying aspects of the invention differ from a conventional pipelined processor by the addition in the execution unit of several elements as well as modifications to the control logic to perform some operations differently than in a conventional pipelined processor. In particular, the issue stage logic is discussed below, the issue stage being that logic that determines when and in what sequence a stream of instructions is issued to the pipeline for execution by the execution unit.

As shown in FIG. 1, the execution unit 100 includes a register file 101 and an operator unit 102, connected in a feedback arrangement. The operator unit 102 may be an adder, a multiplier or any other arithmetic or logical operational circuit that may be used in an accumulation. For the purposes of this description, the operator unit is assumed to have two operand inputs 103, 104. Operands are fetched from a register of the register file 101 and results returned to a destination register of the register file 101, according to the software instruction being processed.

In accordance with aspects of the invention, multiplexers 105, 106, not used in a conventional execution unit, are provided at each of the inputs to the operator unit 102 to allow introduction of an alternate input value 107 when interleaved streams are started in the pipeline, for example "0s" if the operator unit 102 performs addition, and also to provide an alternate feedback path 108 during the combining of the streams, rather than the conventional feedback path 109 from the output 110 of the operator unit 102 to the register file 101 in which operand and destination registers are located. Within the alternate feedback path 108, between the output 110 of the operator unit 102 and one input of one multiplexer 105, a single temporary register, T, is provided. The register, T, is only used when combining the interleaved streams.

In a controller 111, accumulation detection circuits are provided to detect the start and end of an accumulation. If the processor is interlocked, the controller includes interlock circuits. In that case, the accumulation detection circuits may be modifications to the interlock circuits of an interlocked processor. Alternatively, in an interlocked processor or in a non-interlocked processor, the accumulation detection circuits may be independent circuits specifically provided to perform the detection. Additionally, in an interlocked processor, circuits are provided to control the processing of interleaved streams, and their recombination during a clean-up phase, because the steps required to achieve this processing are not explicitly provided for in the instruction stream being processed. In a non-interlocked processor, instructions are ordered by a compiler, for example, to achieve the interleaving and clean-up.

Operation of a method or apparatus in accordance with principles of aspects of the invention is now explained in connection with the pipeline diagrams of FIGS. 2 and 3.

Figure 2:
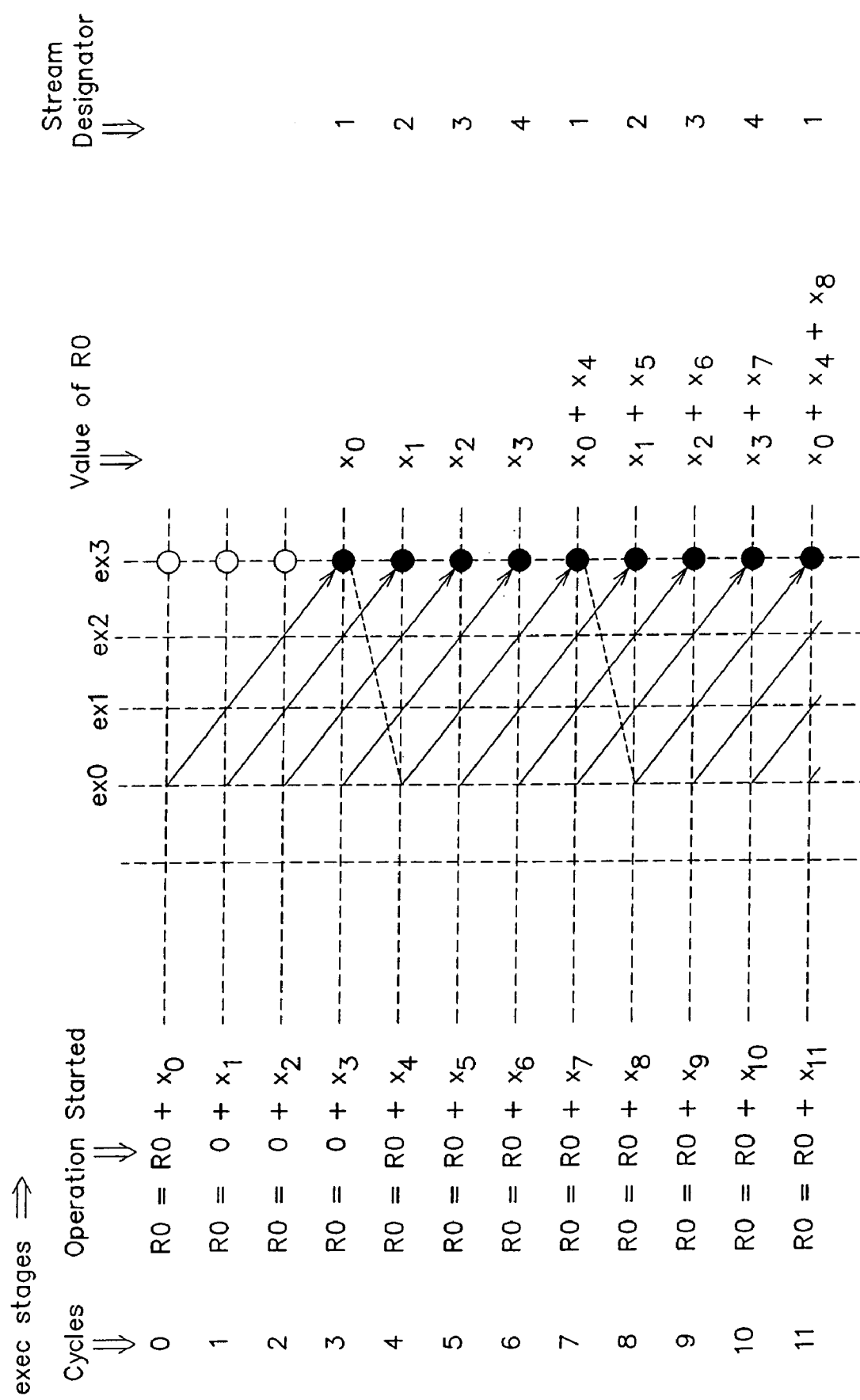
FIG. 2 is a pipeline diagram of the execution of an accumulation in register R0 by an execution unit having a four stage execution pipeline.
Figure 3:
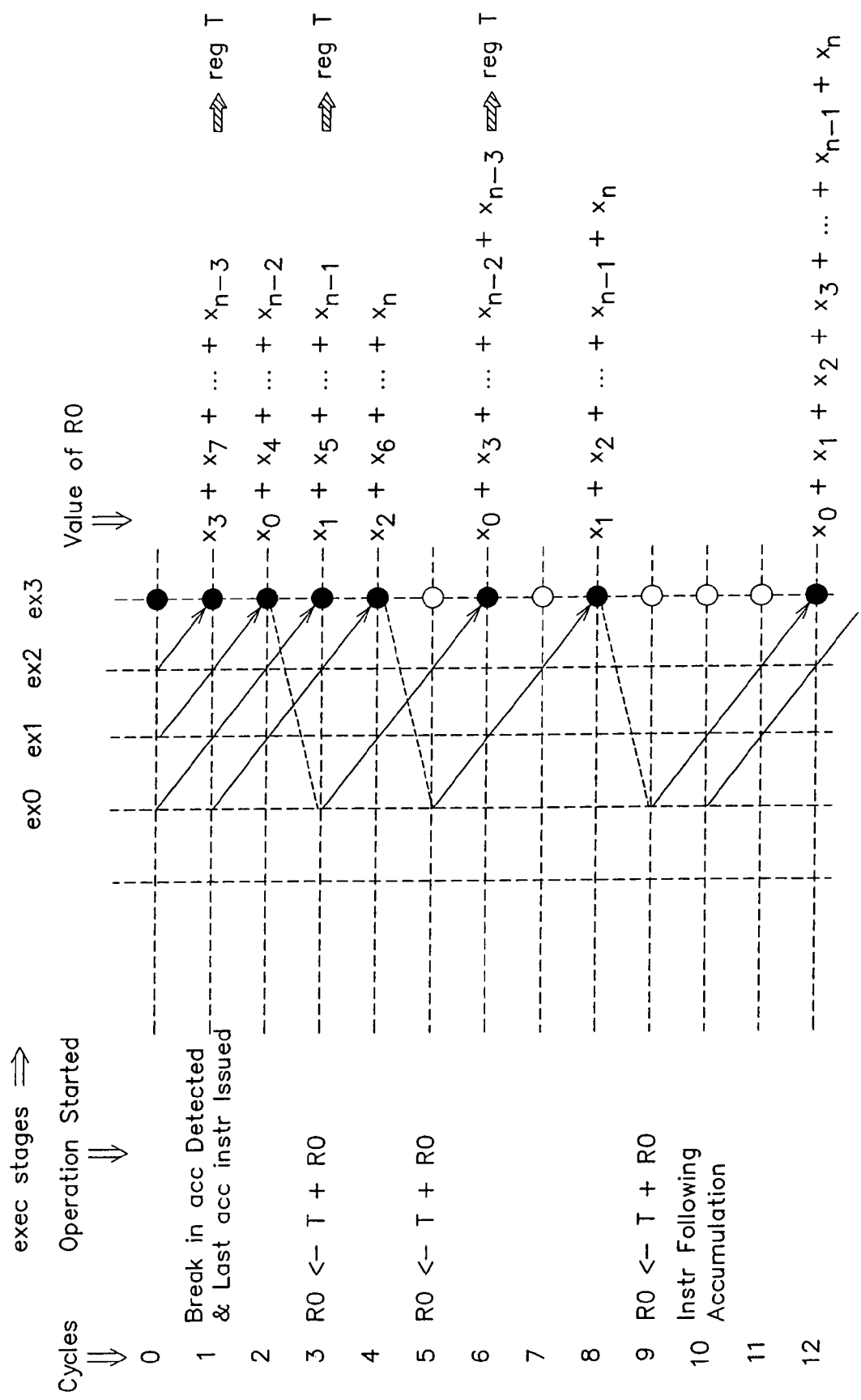
FIG. 3 is a pipeline diagram of the clean-up phase of the accumulation illustrated in FIG. 1.

The exemplary pipeline represented in FIGS. 2 and 3 is four stages deep, that is p=4, having execution stages ex0, ex1, ex2 and ex3. The depth of the pipeline shown is for illustrative purposes, only. The principles illustrated are applicable to pipelines of any depth, including pipelines of two or more stages and pipelines of any other arbitrary depth. The exemplary pipeline illustrates an accumulation using an addition instruction, although the principles are readily applicable to other instructions.

In this example, a source of "0s" is required to provide one of the operands at the start of each interleaved instruction stream, as explained below. On an interlocked machine, the special instructions that produces the interleave and perform the clean-up requires the interlock to be shut off or bypassed. The controller will need to keep track of such parameters as the depth of the pipeline and the number of current interleaves, so that the process can be completed during clean-up.

In the example shown, the control logic detects that an accumulation instruction, $R0 \leftarrow R0+R_M$, where $R_M$ is successively loaded with values $x_N$, beginning with an initial value $x_0$, has been fetched to be injected into the pipeline. Loading of $R_M$ occurs in parallel with the described computation. The example further assumes that a number of such instructions, say for N=1 to n, where n>4, are to be executed. Naturally, n can be any number of iterations at all, although the advantages of the invention do not accrue unless n>p, and preferably n>>p.

As shown in FIG. 2, the first instance of the instruction, $R0 \leftarrow R0+x_0$, is handled as it normally would be handled. If there is a dependency upon a prior instruction to supply the initial contents of R0, then the instruction, $R0 \leftarrow R0+x_0$ is stalled in the normal manner. Once the prior instruction completes, then the instruction, $R0 \leftarrow R0+x_0$ is injected into the pipeline. The values of R0 and $x_0$ are fetched for execution stage ex0 in cycle 0. Then, rather than waiting for the first instruction to complete, the control logic starts another p−1 instructions, in this case another three instructions during cycles 1, 2 and 3, but replacing the reference to R0 with "0," the identity element (FIG. 1, 107) for the accumulation (addition) being performed. If the accumulation was based on a multiplication instruction, then the identity element with which the reference to R0 would be replaced is "1," the identity element (FIG. 1, 107) for multiplication. Each of these four initial instructions form the start of a separate stream, designated streams 1, 2, 3 and 4. At cycle 1, processing of $R0+x_0$ reaches execution stage ex1, while processing of $0+x_1$ begins in execution stage ex0. Continuing, at cycle 2, processing begins on the term $0+x_2$, while processing of $R0+x_0$ reaches execution stage ex2 and $0+x_1$ reaches execution stage ex1. At cycle 3, $R0+x_0$ is assigned to R0 in execution stage ex3, completing the first computation of stream 1. Stream 1 resumes in cycle 4, picking up operand $X_4$ to add to the value $(R0+X_0)$ in R0. The value in R0 rotates among the four streams as each completes a computation, in turn. Each stream continues, independently of each other stream, picking up the fourth operand from the one most recently processed in that stream. Thus, for example, stream 1 accumulates the value $R0+x_0+x_4+x_8+\ldots$ No additional registers are required to store the intermediate values of the different streams, as they are stored in the pipeline, while they are being processed. The pipeline itself includes registers in which intermediate values of instructions in process are stored.

A break in the accumulation occurs when the next instruction in a stream of instructions is not another instance of the instruction $R0 \leftarrow R0+R_M$. Once a break in the accumulation is detected, clean-up phase is entered, as illustrated in FIG. 3.

First, the controller stalls the sequencer fetching and inserting instructions into the pipeline. The controller then issues a special sequence of clean-up instructions designed to recombine the four streams and store the result in the originally designated destination register. If a different number of streams were interleaved, then a different special sequence of clean-up instructions is required.

The sequence for the pipeline illustrated, having a depth, p, of 4: instructions, is as follows.

When a break in the accumulation is detected, the last accumulate computation is started in the pipeline at cycle 1, while the fourth from the last stream, which is now complete, is assigned to temporary register, T. The third from the last stream is allowed to complete at cycle 2. Then, in cycle 3, register R0 is used to combine the third and fourth from last streams. Meanwhile, in cycle 3, the second from the last stream result is assigned to register T. Finally, in cycle 4, the last stream completes into register R0. In cycle 5, the combination of the second from last and last streams to complete into register T is begun, while in cycle 6, the combination of the third and fourth from last streams completes. In cycle 8, the combination of the second from last and last streams completes, and in cycle 9 the combination of the two partial accumulations that remain is begun into R0. In cycle 10, the next instruction can finally be released into the pipeline.

Figures 4A, 4B:
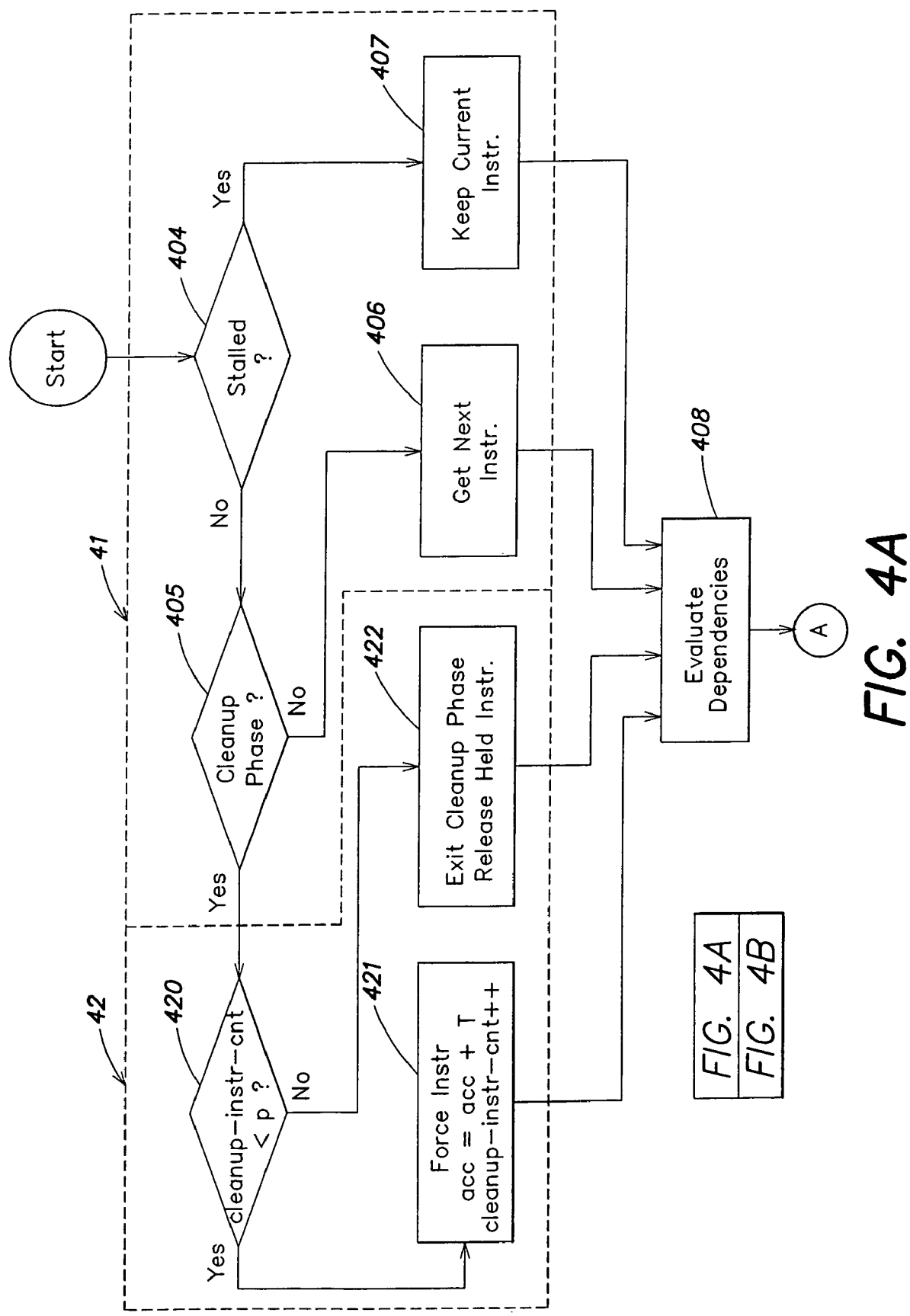
FIGS. 4A and 4B illustrate a flowchart of a method embodying aspects of the invention.

Now, one method illustrating aspects of an embodiment of the invention is described in detail in connection with FIGS. 4A and 4B. In order to more easily describe the modes of operation according to the exemplary method, the steps illustrated in FIGS. 4A and 4B are grouped into four groups 41, 42, 43 and 44. According to the exemplary method there are three modes of operation: normal (group 41 followed by group 43), accumulate (group 41 followed by group 44) and clean-up (group 42 followed by group 43).

The method uses the normal mode of operation whenever no accumulation instruction has been encountered. Normal mode (41, 43) is similar to the prior art, until an accumulation instruction is encountered. Normal mode (41, 43) includes issuing instructions, evaluating dependencies between instructions and within instructions, determining when to stall the issuance of instructions and determining when to enter accumulate (41, 44) or clean-up (42, 43) phases. This is done as follows.

First, a determination is made as to whether the issuance of instructions has been stalled (step 404). If instruction issuance has not been stalled (step 404), then a determination is made as to whether instruction execution has entered clean-up phase (step 405). If the system has not entered clean-up phase (step 405), then the next instruction is fetched (step 406). If instruction execution has been stalled (step 404), then the system simply keeps the current instruction (step 407) and does not proceed to fetch the next instruction. Whether the next instruction has been fetched (step 406) or the current instruction has been kept (step 407), the system in both cases then proceeds to evaluate dependencies (step 408).

In an interlocked machine, data dependency is checked in hardware. One common method is by using a register scoreboard. Any time an instruction is issued to the execution unit, an in-use bit is set for the destination register in a special purpose register or memory location referred to as the register scoreboard. The in-use bit is cleared when the instruction execution has been completed and the result written to the destination register. Dependency can thus be checked for each instruction to be issued by checking the in-use bits for the operands of the instruction in the register scoreboard. If any of the operands have in-use bits that are set, then the instruction is dependent. Since the in-use bits are set when the instruction is issued to the execution unit, this dependency check (step 408) does not check for self-referential instructions, i.e. iteration operations or accumulations. As will be seen, this is performed at a later stage. If a dependency is detected (step 409) and the accumulation phase has not been entered (step 410), then instruction issuance is stalled (step 411). A bit identifying that instruction issuance has been stalled, (step 411), is preserved to later be checked when the execution unit performs these steps, again, returning to step (step 404). The state information may be preserved by any suitable means, for example by the state of a bit in a flag register.

Returning to the evaluation of dependencies (step 408), if a dependency is not found (step 409) and accumulation phase is not currently active (step 412), then a self-referential dependency is checked to determine whether the instruction to be issued is an accumulation instruction (step 413). This check simply determines whether the destination register of an instruction is also used as an operand for the instruction. If the instruction is determined not to be an accumulation instruction, then the instruction is issued (step 414) and the issue stage completes its cycle. If however, the instruction is determined to be an accumulation instruction (step 413), then accumulate (41, 44) phase is entered, the accumulator register is recorded using any suitable means, for example a register scoreboard, and a counter, acc-instr-cnt, is set to zero, and the instruction is issued (step 415). The counter acc-instr-cnt is used by the execution unit controller to determine when to insert identity elements during the early part of accumulation phase. At this point, the issue stage has completed its normal mode (41, 43) cycle.

When accumulate phase (41, 44) has been entered, then the second half of the operation of the issue stage varies from the operation described above, (group 44, rather than group 43) but the first half of the operation (group 41) proceeds as before.

If the dependency evaluation (step 408) determines (step 409) that the instruction to be issued is a dependent instruction and the issue stage is in accumulation phase (step 410), then the instruction to be issued is evaluated to determine whether or not it is also an accumulation instruction (step 416). If the instruction to be issued is indeed an accumulation instruction (step 416), then a further determination is made by reference to the accumulator register scoreboard whether the same accumulator is involved (step 417). If so, then the instruction to be issued is simply the next in the series of instructions making up a single accumulation and the counter acc-instr-cnt is incremented, and the instruction issued (step 418).

If, however, the instruction to be issued is either not an accumulation instruction (step 416) or is an accumulation instruction (step 416), but not involving the same accumulator register as the preceding accumulation instruction (step 417), then the current accumulation phase is exited, and clean-up phase is entered (step 419). Designation and recording of this state information may be done by any suitable means, for example by setting flag bits in a flag register. At this time, a cleanup-instr-cnt counter is set to zero, as is a cleanup-instr-compl-cnt counter (step 419). The counter cleanup-instr-compl-cnt is incremented outside of the control logic described here. It keeps track of instructions completed during clean up, so the data path control logic can direct some results to register T as described above. The counter cleanup-instr-cnt keeps track of cleanup phase progress so special cleanup instructions can be executed. The instruction that triggered the exit from accumulation phase is held, and a NOP instruction is issued instead.

Finally, if the dependency evaluation (step 408) finds no dependency on a prior instruction (step 409), and the issue stage is in accumulation phase (step 412), then the current instruction must be a break in the accumulation because accumulate instructions, i.e. self-referential instructions, always depend for each iteration on the result of the previous iteration. Therefore, control passes to the accumulation phase exit routines (step 419), which begins clean-up phase as described above. This issue stage accumulation (41, 44) cycle is then complete.

In clean-up phase (42, 43), the first half of the issue stage process is modified 42, while the second half proceeds as in normal mode 43. If the issue stage is not stalled (step 404) and clean-up phase has been entered (step 405), then a check is made as to whether a condition wherein the counter cleanup-instr-cnt is less than the depth of the pipeline, p, is true (step 420). If that condition is true, then clean-up phase has not yet been completed and the issue stage forces an instruction to combine the independent streams of instructions created during accumulation phase (step 421). Also, the counter cleanup-instr-cnt is incremented (step 421). When the counter cleanup-instr-cnt reaches the value p, then the condition is false (step 420), and clean-up phase is exited (step 422). The held instruction (see step 419) is therefore now released (step 422). In either case, execution of this issue stage cycle continues by evaluating the dependencies of the instruction to be issued (step 408), and continuing as described above. That completes the clean-up (42, 43) cycle of the issue stage.

The improvement achieved by embodiments of aspects of the invention is regardless of the actual depth of the pipeline in the functional units preceding the execution units.

Figure 4B:
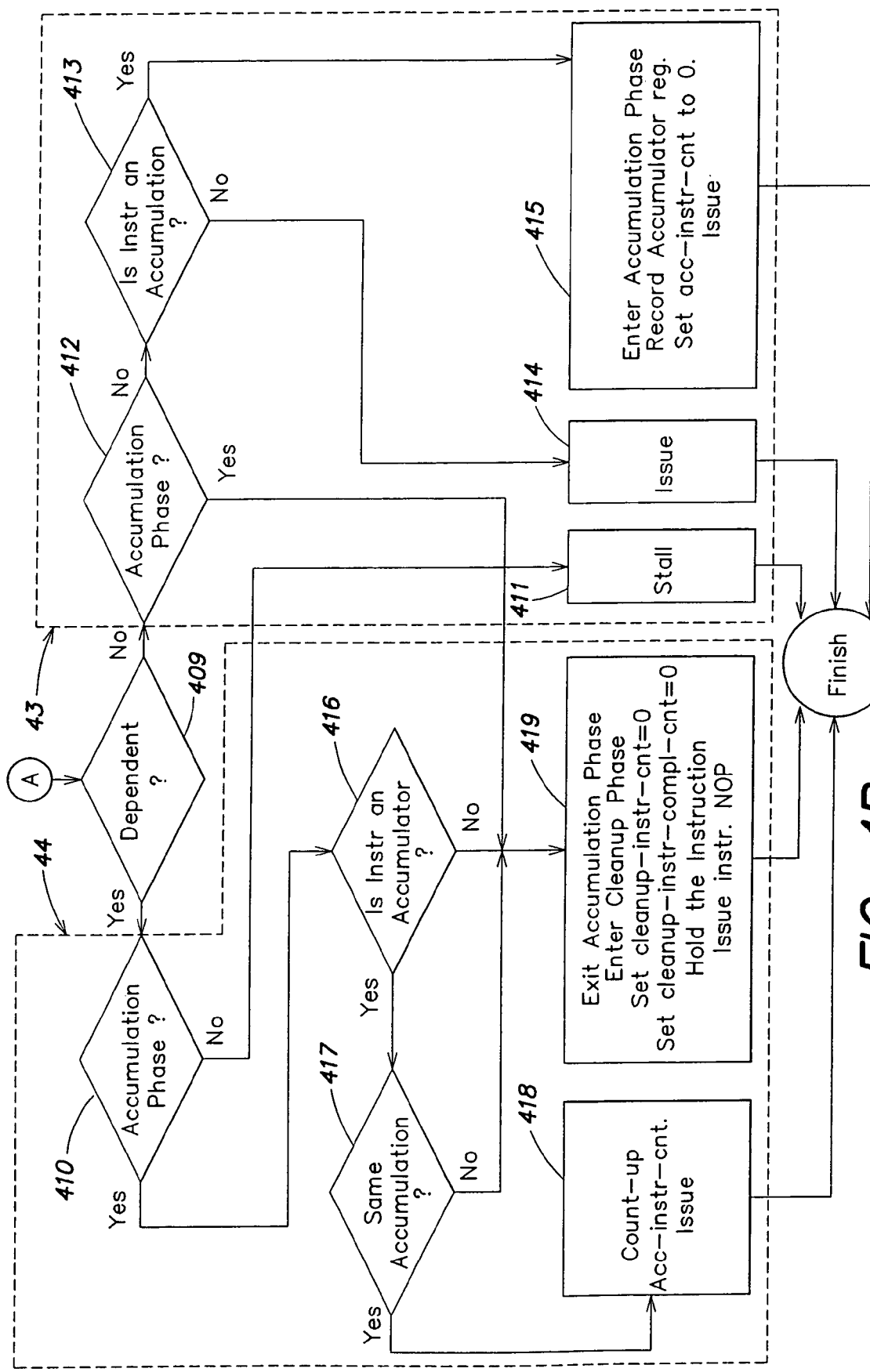
Figure 5:
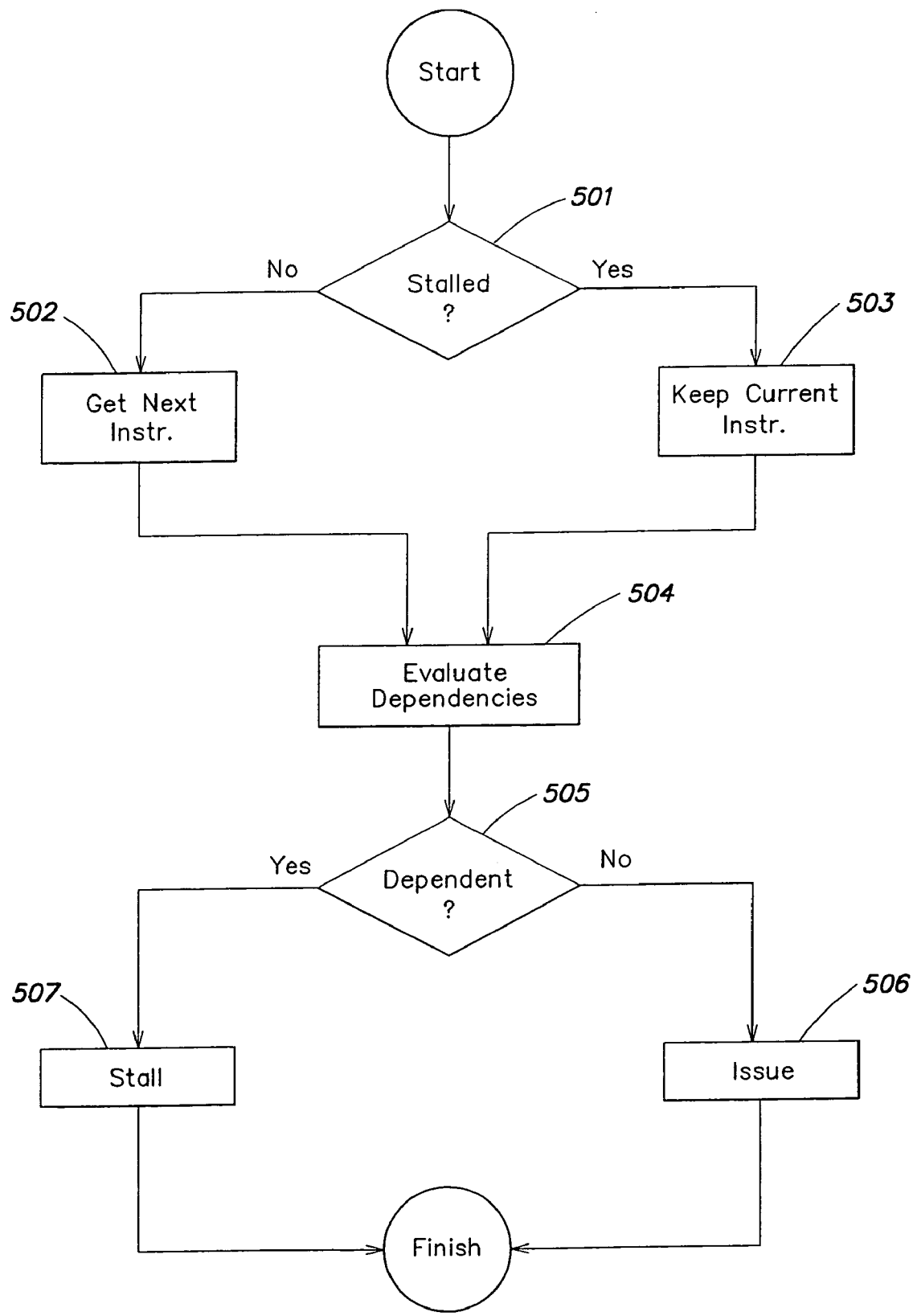
FIG. 5 is a flowchart of a conventional method of issuing instructions to an execution pipeline in an execution unit.
Figure 6:
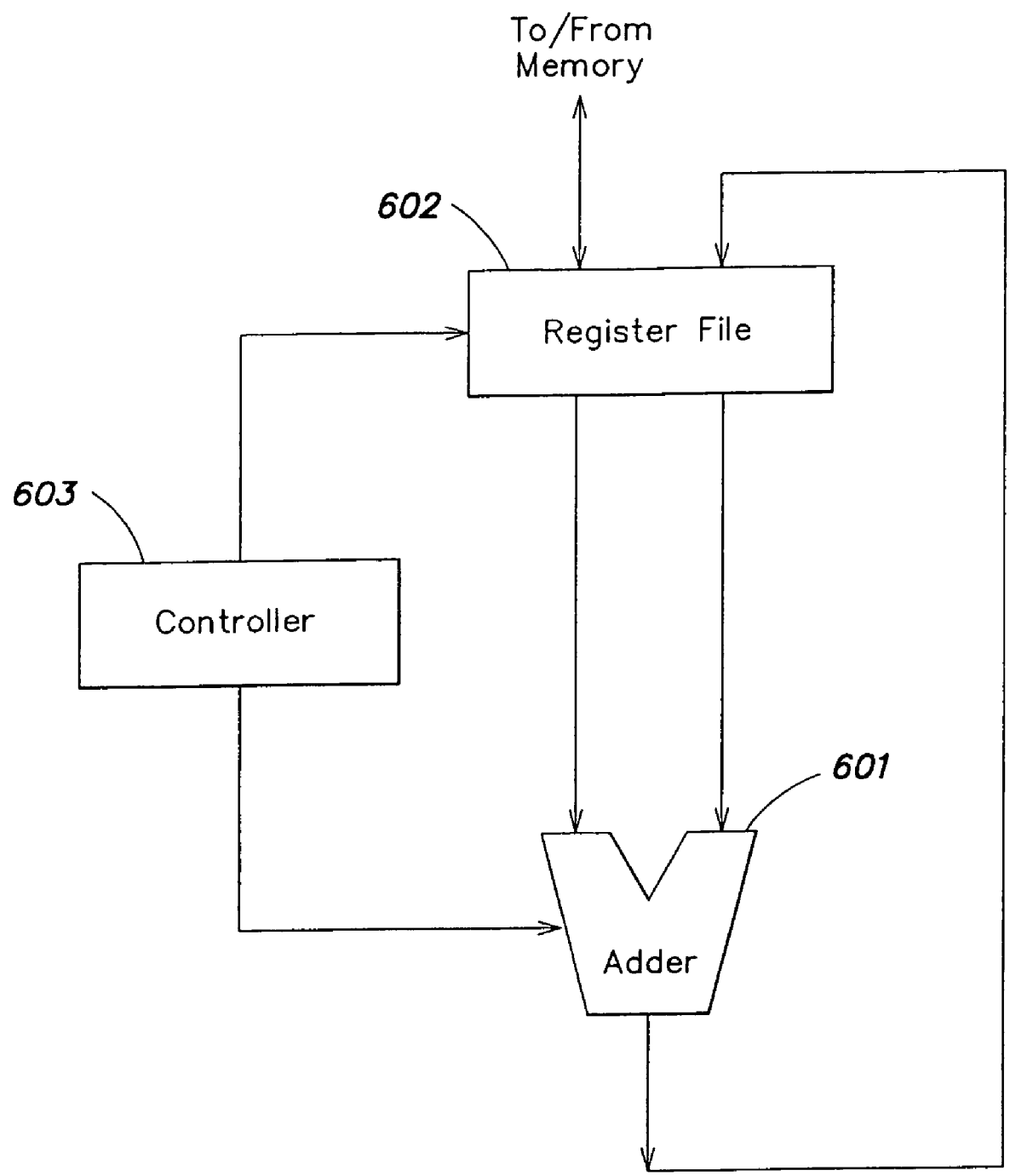
FIG. 6 is a block diagram of an example of a conventional execution unit.

The invention has been illustrated by a description of embodiments of aspects thereof in the hardware of an interlocked processor. Now, the invention is further illustrated by a description of embodiments of aspects thereof in software executing on a non-interlocked processor. As is discussed above, software including dependencies that would stall an interlocked processor can be compiled for execution on a non-interlocked processor by inserting NOP instructions, or unrelated instructions from another part of the instruction stream, to separate dependent instructions by a sufficient number of processor cycles to allow a first instruction to complete execution before the result of execution of the first instruction is required by a second instruction. In contrast, the following description of embodiments of aspects of the invention produces software that when executed performs the method of FIG. 4.

According to this aspect, using a four-stage execution unit pipeline as a non-limiting example, when the software compiler encounters in source code an accumulation instruction, the instruction stream output for execution by the processor already has the special sequence described above in connection with FIG. 2 that produces plural streams of accumulations that do not contain any internal dependencies. The first instruction of the accumulation is output normally (FIG. 2, cycle 0). The second through fourth has the operand replaced by the identity element, e.g., for a summation, "0," (FIG. 2, cycles 1–3). The instructions output by the compiler then are those ordinarily required to complete the interleaved streams of accumulation, until a break in the accumulation is detected. When a break in the accumulation is detected, the compiler outputs clean-up instructions, as discussed above in connection with FIG. 3. The clean-up instructions may use a specially provided temporary register similar to register "T" discussed above. Alternatively, the compiler may arrange for a context switch to free up a register in the register file of the execution unit, so it can be used as a temporary register. Then, the instructions combining the streams are output.

To put the above discussion another way, in a non-interlocked but fully pipelined processor, the compiler keeps track of the latency of the instructions while generating instructions. It thus ensures that there are adequate number of non-related instructions between a pair of dependent instructions, so that all the operands required by a given instruction are available before that instruction is issued to the execution unit.

The example of accumulation of N values in an array can thus be written conventionally as:

```
I0 ← Addr;                          /* Head of the buffer      */
                                    /* in the index register   */
     R0 ← 0;                        /* clear the accumulator   */
     R1 ← (I0++);                   /* load data into R1 and   */
                                    /*    increment pointer    */
repeat (N , 4);                     /* repeat next 4 */
                                    /* instructions N times    */
Begin: R0 ← R0 + R1, R1 ← (I0++);   /* add R1 to R0            */
                                    /* repeatedly              */
       NOP;
       NOP;
End:   NOP;
```

In this example, the NOP instructions are the non-related instructions required in the instruction stream so that the value in R0 computed by any iteration is ready for use in the same instruction in the next iteration.

Even though the load operation can also take multiple cycles, other suitable techniques can be used to get around that problem by restructuring the pipeline so that loads happen earlier in the pipeline than addition, thereby virtually eliminating any load-to-use stall cycles. So, in the context of the present invention, loads can be treated as though they complete in one cycle.

The above code can be reordered by the compiler, so that a pipeline trace as shown in FIGS. 2 and 3 is produced. An example of such code is as follows:

```
I0 ← Addr;                    /* Head of the buffer in   */
                              /*    the index register   */
R0 ← 0;                       /* clear the accumulator   */
R1 ← (I0++);                  /* load data into R1 and   */
                              /*      increment pointer  */
R0 ← R0 + R1, R1 ← (I0++);    /* First iteration         */
R0 ← 0 + R1, R1 ← (I0++);     /* feed 0s with items 2–4  */
R0 ← 0 + R1, R1 ← (I0++);     /* feed 0s with items 2–4  */
R0 ← 0 + R1, R1 ← (I0++);     /* feed 0s with items 2–4  */
repeat (n–8 , 1);             /* repeat next             */
                              /* instructions N–8 times  */
Begin:R0 ← R0 + R1, R1 ← (I0++); /* add R1 to R0         */
                              /*       repeatedly        */
                              /* clean up instructions   */
                              /*         follow          */
T ← R0 + R1, R1 ← (I0++);     /* 4th from last iteration */
R0 ← 0 + R1, R1 ← (I0++);     /* 3rd from last iteration */
T ← 0 + R1, R1 ← (I0++);      /* Penultimate iteration   */
R0 ← 0 + R1, R1 ← (I0++);     /*     last iteration      */
NOP;
T ← R0 + T;
NOP;
T ← R0 + T;
NOP;
NOP;
NOP;
R0 ← R0 + T;
```

The original code would take 4N+4 cycles, whereas the new code takes N+12 cycles. The above code, embodying aspects of the invention, does not require any change in the hardware. The register T can be any available data register. It is possible to reduce code size by absorbing four instructions (not shown) following the looped instruction into the loop, with attendant suitable hardware changes as would be understood by the skilled artisan.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of executing an instruction stream in a pipelined execution unit of depth, p, comprising:
    loading the instruction stream;
    detecting, in control logic, an iteration operation in an instruction in the loaded instruction stream based on the iterated instruction having an operand register and a destination register that are the same and on consecutive instructions having the same destination register;
    starting iterated instructions from the instruction stream in the pipelined execution unit and overriding a stall requirement based on data-dependence checking, thereby creating p independent threads of the iterated instructions for concurrent execution in the pipelined execution unit, wherein the pipelined execution unit provides intermediate storage for the p threads;
    detecting an end of the iteration; and
    combining results obtained from the p threads after all programmed iterations have completed.

2. The method of claim 1, wherein p is at least 2.

3. The method of claim 1, further comprising:
    disabling interlocking for the detected iteration of the instruction.

4. The method of claim 1, wherein the iteration of the instruction performs an arithmetic accumulation.

5. The method of claim 1, wherein the iteration of the instruction performs an arithmetic product.

6. A method of executing an instruction stream in a pipelined execution unit, comprising:
    providing to the execution unit the instruction stream as a sequence of instructions in natural order absent software scheduling;
    detecting, in control logic, an iteration operation in an instruction in the sequence of instructions based on the iterated instruction having an operand register and a destination register that are the same and on consecutive instructions having the same destination register;
    introducing into the pipelined execution unit plural iterated instructions, each with different data, thereby creating plural independent threads of the iterated instructions for concurrent execution in the pipelined execution unit; and
    combining results for each of the plural threads in the pipelined execution unit.

7. The method of claim 6, further comprising:
    disabling interlocking for the detected iteration of the instruction.

8. The method of claim 6, wherein the iteration of the instruction performs an arithmetic accumulation.

9. The method of claim 6, wherein the iteration of the instruction performs an arithmetic product.

10. In a programmable data processor including instruction interlocks and including a pipelined computation unit having a pipeline of depth p, a circuit comprising:
    a controller constructed and arranged to detect an iterative computation in an incoming instruction stream; the controller comprising a circuit constructed and arranged to detect an instruction having a single register designated as both a source of an operand and a destination for storing a result; a circuit constructed and arranged to detect a break in an iteration; and a circuit that disables read-after-write and write-after-read interlocks.

11. The circuit of claim 10, wherein the controller is constructed and arranged to interleave up to p independent threads of the iterative computation which are overlapped in the pipeline.

12. The circuit of claim 11, the controller further comprising:
    a circuit constructed and arranged to combine p intermediate results from the p threads into a final result.

13. The circuit of claim 12, further comprising a register T not used for other computation;
    the controller being further constructed and arranged to redirect results to the register T, after detection of the break.

14. The circuit of claim 10, the controller further comprising:
a circuit constructed and arranged to redeploy the interlocks after the iteration is completed.

15. A method of executing an instruction stream in a pipelined execution unit, comprising:
detecting an iteration of an instruction in the instruction stream based on the iterated instruction having an operand register and a destination register that are the same and on consecutive instructions having the same destination register
concurrently executing plural independent threads of the iterated instruction in the pipelined execution unit without storing intermediate results outside the pipelined execution unit; and
recombining the concurrently executed plural independent threads to provide a single result;

wherein concurrently executing and recombining use only one destination register and only one temporary register in addition to the pipelined execution unit.

16. The method of claim 15, further comprising:

introducing operands whose value is the identity value for the instruction during an initiation phase.

* * * * *